US005390650A

United States Patent [19]

Gee et al.

[11] Patent Number: 5,390,650

[45] Date of Patent: Feb. 21, 1995

[54] EXHAUST GAS OXYGEN SENSOR MONITORING

[75] Inventors: Thomas S. Gee, Canton; Thomas A. Schubert, Novi; Paul F. Smith, Dearborn Heights, all of Mich.

[73] Assignee: Ford Motor Company, Dearborn, Mich.

[21] Appl. No.: 31,408

[22] Filed: Mar. 15, 1993

[51] Int. Cl.[6] ....................... F02D 41/14; G01M 15/00

[52] U.S. Cl. .................................... 123/692; 73/118.1

[58] Field of Search ....................... 123/691, 692, 688; 73/118.1; 204/401

[56] References Cited

U.S. PATENT DOCUMENTS 4,703,735 11/1987 Minamitani et al. ................ 123/692
4,984,551 1/1991 Moser .................................. 123/692
5,157,919 10/1992 Gopp ..................................... 60/274
5,159,810 11/1992 Grutter et al. ......................... 60/274

FOREIGN PATENT DOCUMENTS 190631 9/1985 Japan .................................. 123/692

*Primary Examiner*—Tony M. Argenbright
*Attorney, Agent, or Firm*—Peter Abolins; Roger L. May

[57] ABSTRACT

Air/fuel ratio in an internal combustion engine is controlled so as to test the operation of an exhaust gas oxygen sensor. The engine is divided into two banks, each bank including an intake bank of cylinders, an exhaust path, and an exhaust gas oxygen sensor in the exhaust path. Air/fuel ratio control signals are used in connection with each of the two banks, the control signals being 180° out of phase with each other.

2 Claims, 2 Drawing Sheets

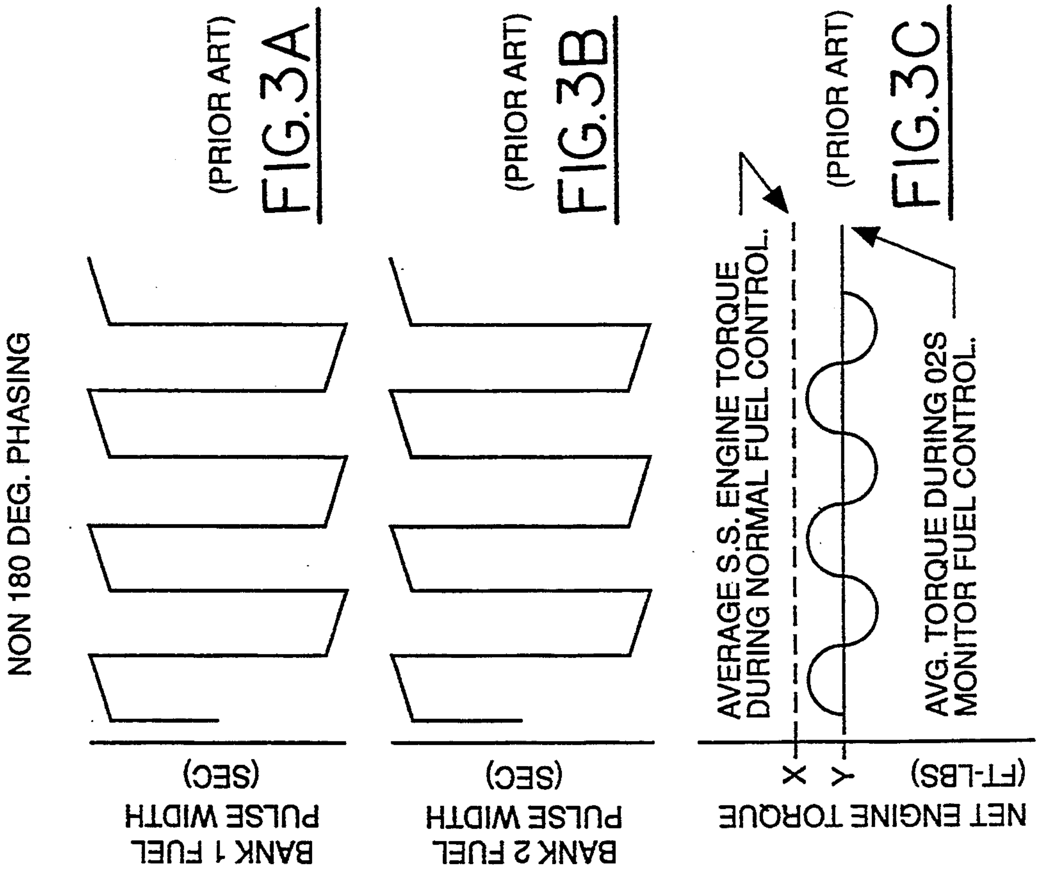
FIG.3A (PRIOR ART)
FIG.3B (PRIOR ART)
FIG.3C (PRIOR ART)
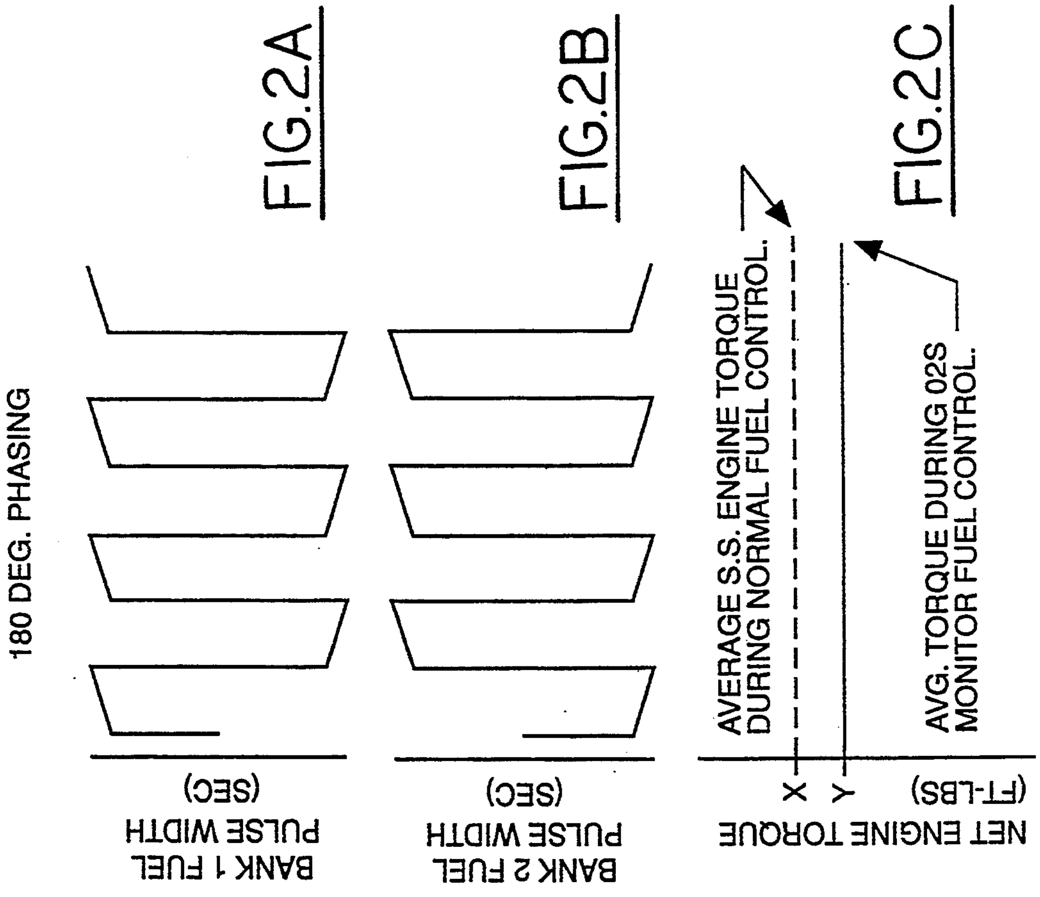
FIG.2A
FIG.2B
FIG.2C

EXHAUST GAS OXYGEN SENSOR MONITORING

BACKGROUND OF THE INVENTION

1. Field of the Invention

This invention relates to controlling air/fuel ratio of an internal combustion engine having an electronic engine control system.

2. Prior Art

It is known to operate an internal combustion engine Using feedback controlled electronic engine control systems. A feedback signal can be provided by an exhaust gas oxygen sensor in the exhaust of the engine. The output signal from such exhaust gas oxygen sensor can indicate whether the engine is operating rich or lean of stoichiometry. This information is then processed by an electronic engine control module to adjust the air/fuel ratio by, for example, adjusting the amount of fuel injected into a cylinder. To ensure proper operation of such a feedback control system and confirm that the exhaust gas oxygen sensor is operating properly, it is known to test the exhaust gas oxygen sensor during system operation.

One such test can be to test the exhaust gas oxygen sensor response rate. For example, it is possible to drive the sensor at a fixed frequency using rich and lean air/fuel ratio excursions. That is, the output voltage of the exhaust gas oxygen sensor is monitored to determine how the sensor responds to known air/fuel ratio variations. Unwanted side effects of such a test are torque, engine speed, and engine load oscillations at the driven frequency. This invention overcomes .such undesired side effects.

SUMMARY OF THE INVENTION

In accordance with an embodiment of this invention, an exhaust gas oxygen sensor is tested for its response rate by having a known air/fuel ratio excursion applied to the engine and the output of the exhaust gas oxygen sensor monitored. Any undesired torque, engine speed, or load oscillations are reduced to improve drivability. This is accomplished using out-of-phase application of the air/fuel ratio variation to at least two cylinders.

For example, in multi-bank systems such as in six and eight cylinder applications, and even in applications using individual cylinder fuel control, the fuel oscillations are modified to reduce the unwanted side effects and improve drivability. The phasing of the forced fuel excursions are such that the engine torque fluctuations are minimized. On a two-bank fuel control system, 180° phasing is used so that during rich and lean air/fuel ratio excursions of the exhaust gas oxygen sensor monitor, one bank is lean while the other bank is rich. This 180° phasing of the two banks decreases the magnitude of engine torque fluctuations and improves drivability.

BRIEF DESCRIPTION OF THE DRAWINGS

FIG. 2(A, B, C) is a graphical representation of 180° phasing of fuel control in accordance with an embodiment of this invention.

FIG. 3(A, B, C) is a graphical representation of non-180° phasing in accordance with the prior art.

DETAILED DESCRIPTION OF THE INVENTION

Figure 1:
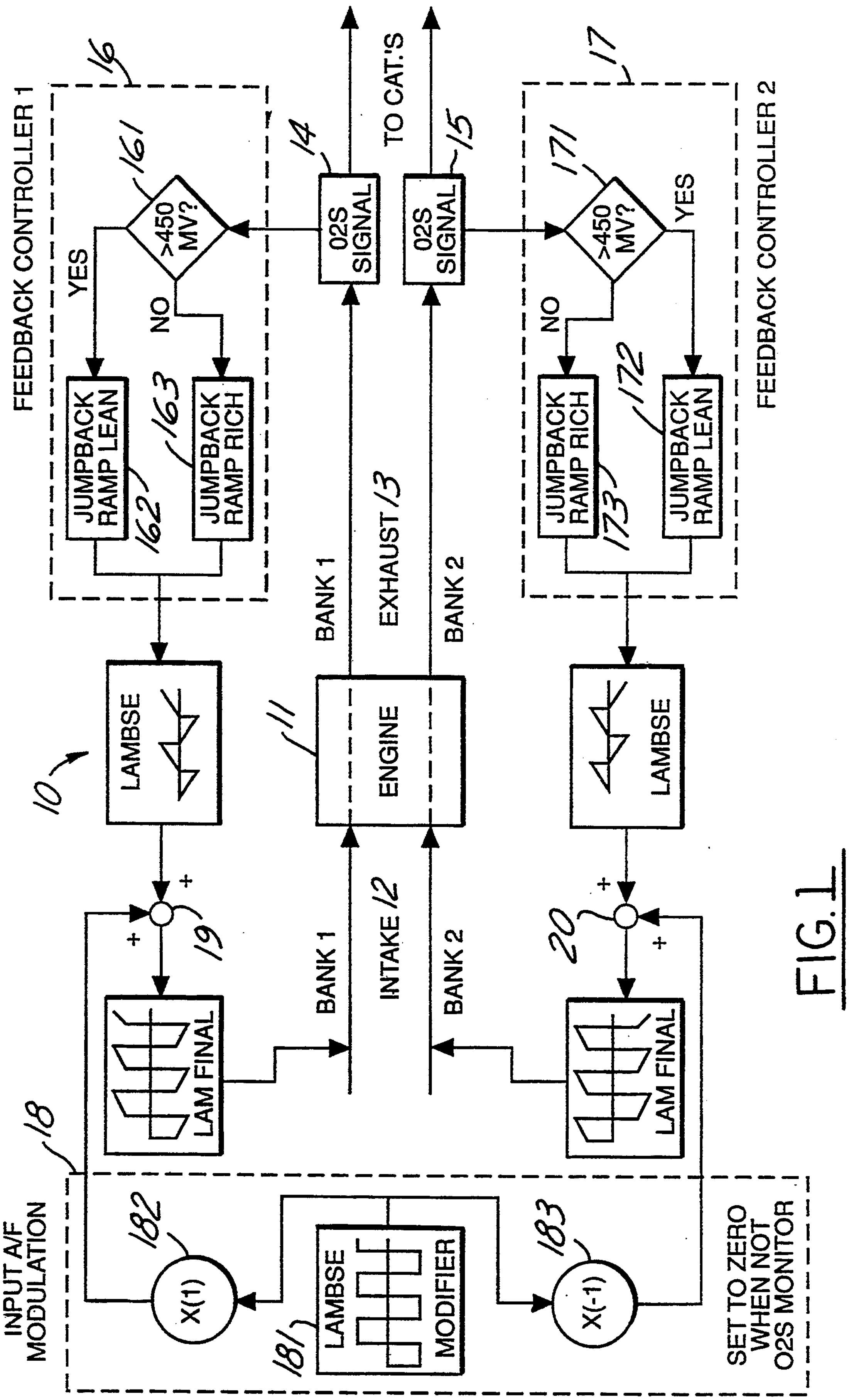
FIG. 1 is a block diagram of a fuel control system in accordance with an embodiment of this invention.

Referring to FIG. 1, a fuel control and oxygen sensor monitor phasing system 10 includes an engine 11 having an intake 12 with an intake bank 1 and an intake bank 2, and an exhaust 13 with an exhaust bank 1 and an exhaust bank 2. Exhaust bank 1 of exhaust 13 passes an oxygen sensor 14, and exhaust bank 2 of exhaust 13 passes an oxygen sensor 15. A feedback controller 16 is coupled to oxygen sensor 14, and a feedback controller 17 is coupled to oxygen sensor 15. An input air/fuel modulation controller 18 supplies a first bank output to a summer 19 which is also coupled to receive the output of feedback controller 16. A second bank output of input air/fuel modulation controller 18 is coupled to a summer 20 which also receives the output of the feedback controller 17. The output of summer 19 is used to control the air/fuel ratio applied to intake bank 1 of intake 12. The output of summer 20 is used to control the air/fuel ratio applied to intake bank 2 of intake 12.

Feedback controller 16 includes a decision block 161 which interrogates if the signal received from oxygen sensor 14 is greater than 450 millivolts. If Yes, logic flows to a block 162, which causes a jump-back and then a ramp to a more lean air/fuel ratio. If the signal is not greater than 450 millivolts, logic flow goes to a block 163 which causes a jump-back and then a ramp to a rich air/fuel ratio. The output of jump-back lean module 162 and jump-back ramp rich module 163 is applied as an air/fuel ratio to summer 19. This output applied to summer 19 is a normalized air/fuel ratio control signal (lambse) which is driven lean until switching of oxygen sensor 14 occurs, then driven rich until switching of oxygen sensor 14 occurs, and so on, to provide feedback control of the air/fuel ratio about stoichiometry.

Analogously, feedback controller 17 includes a logic lock 171 wherein there is comparison made to see if the signal from oxygen sensor 15 is greater than 450 millivolts. If it is, logic flow goes to a jump-back ramp lean module 172. If not, logic flow goes to a jump-back ramp rich module 173. The outputs of jump-back ramp rich module 173 and jump-back lean module 172 are applied to summer 20.

During normal closed-loop fuel control, banks 1 and 2 of intake 12 and exhaust 13 are completely independent and act in an uncoupled manner. A lambse modifier provided in input air/fuel modulation controller 18 is used during diagnostics to determine proper operation of oxygen sensors 14 and 15 during monitoring of the system when the system is driven at a specific frequency and fuel excursion. A minus one (−1) multiplier within input air/fuel modulation controller 18 creates the 180° phasing condition.

More specifically, referring to input air/fuel modulation controller 18, there is included a generation of a lambse modifier module 181. This modifies the air/fuel ratio provided by the output of feedback controllers 16 and 17, at summers 19 and 20, respectively, to provide the final air/fuel ratio applied to banks 1 and 2 of intake 12 to engine 11. The output of lambse modifier module 181 is applied to a positive multiplier 182 which couples the modifier to summer 19. The output of lambse modifier 181 is also applied to a negative multiplier 183 which is applied to summer 20. The lambse modifier module 181 is set to zero when the system is not in the oxygen sensor monitor mode. Advantageously, in operation, the lambse modifier is a substantially fixed frequency square wave signal having a sufficiently large amplitude to cause oxygen sensor switching at each excursion. That is, when the lambse modifier and lambse signal are combined at summer 19, the output of summer 19 causes switching of oxygen sensor 14 at the frequency of the lambse modifier, regardless of the magnitude of the deviations from stoichimetric air/fuel ratio generated by the lambse signal.

FIG. 2A shows the fuel pulse width with respect to time applied to bank 1 of intake 12 of engine 11. FIG. 2B shows the fuel pulses applied to bank 2 of intake 12 of engine 11 with respect to time. The fuel pulse widths of intake banks 1 and 2 are 180° out-of-phase. FIG. 2C shows the net engine torque with respect to time of first the average steady-state engine torque during normal fuel control designated as magnitude X, and the average torque during oxygen sensor monitor fuel control designated as being essentially about a magnitude Y.

Referring to FIG. 3, there is shown a prior art non-180° phasing. More specifically, FIG. 3A shows the fuel pulse width applied to intake bank 1, and FIG. 3B shows the fuel pulse width applied to intake bank 2. The pulse width signals are identical and they are not out-of-phase with each other. FIG. 3C shows the net engine torque by using the pulse widths which are in phase with each other. At a net engine torque magnitude of X is the average steady-state engine torque during normal fuel control. In contrast, the average torque during the oxygen sensor monitoring fuel control is at a magnitude Y, but the instantaneous value oscillates in a generally sinusoidal fashion about the average magnitude Y.

Various modifications and variations will no doubt occur to those skilled in the art to which this invention pertains. For example, the particular way of obtaining the out-of-phase signal may be varied from that disclosed herein. These and all other such variations come within the scope of the appending claims.

We claim:

1. A method of controlling air/fuel ratio in an internal combustion engine so as to test the operation of an exhaust gas oxygen sensor, including the steps of:
- establishing a first intake bank of cylinders;
- establishing a second intake bank of cylinders different from said first bank;
- establishing a first bank exhaust path for conducting exhaust from said first intake bank of cylinders;
- establishing a second bank exhaust path for conducting exhaust from said second intake bank of cylinders;
- placing a first exhaust gas oxygen sensor in said first bank exhaust path;
- placing a second exhaust gas oxygen sensor in said second exhaust path; and
- generating air/fuel ratio control signals for said first and second banks of said engine which are 180° out of phase with each other;
- wherein the step of generating 180° out-of-phase air/fuel ratio control signals includes the steps of:
  - providing an exhaust gas oxygen sensor signal from each of the two banks;
  - processing each sensor signal to see if it is greater than a predetermined magnitude;
  - if yes, then starting at least one of a jump-back in the air/fuel ratio and ramping the air/fuel ratio lean;
  - if no, causing at least one of a jump-back in the air/fuel ratio and ramping air/fuel ratio rich;
  - applying the signal from the first exhaust gas oxygen sensor to a first summer;
  - applying the signal from the second feedback controller processor of the second exhaust gas oxygen signal to a second summer;
  - generating an air/fuel ratio modifier to drive the system during monitoring of the exhaust gas oxygen sensor;
  - applying a first modifier to said first summer;
  - applying a second modifier out-of-phase with said first modifier to said second summer;
  - using the output of the first summer to control the air/fuel ratio of the first bank; and
  - using the output of the second summer to control the air/fuel ratio of the second bank.

2. An apparatus for monitoring exhaust gas sensor operation by controlling air/fuel ratio in an internal combustion engine so as to test the operation of an exhaust gas oxygen sensor including:
- a first exhaust gas oxygen sensor to respond to a first portion of engine operation;
- a second exhaust gas oxygen sensor to respond to the operation of a second portion of the engine;
- control means for applying two different air/fuel ratios to said first and second portions of engine operation which are 180° out of phase with each other, thereby reducing the resultant torque variations of the engine;
- a first intake bank of cylinders;
- a second intake bank of cylinders different from said first bank;
- a first bank exhaust path for conducting exhaust from said first intake bank of cylinders;
- a second bank exhaust path for conducting exhaust from said second bank of intake cylinders;
- a first exhaust gas oxygen sensor in said first bank exhaust path;
- a second exhaust gas oxygen sensor in said second bank exhaust path;
- an air/fuel ratio control means for providing a signal for said first and second intake banks of said engine which are 180° out of phase with each other; and
- wherein said air/fuel ratio control means of generating 180° out-of-phase signals includes:
  - input means for receiving an exhaust gas oxygen sensor signal from each of the two banks;
  - processing means for processing each sensor signal to see if it is greater than a predetermined magnitude;
  - logic means to determine, if greater, starting at least one of a jump-back of the air/fuel ratio and ramping the air/fuel ratio lean; and, if not greater, causing at least one of a jump-back of the air/fuel ratio and ramping the air/fuel ratio rich;
  - means for applying the sensor signal from the first exhaust gas oxygen sensor to a first summer;
  - means for applying the sensor signal from the second feedback controller processor of the second exhaust gas oxygen signal to a second summer;
  - means for generating an air/fuel ratio modifier to drive the system during monitoring of the exhaust gas oxygen sensor;
  - means for applying a first modifier to said first summer;
  - means for applying a second modifier, out-of-phase, with said first modifier, to said second summer;
  - means for using the output of the first summer to control the air/fuel ratio of the first bank; and
  - means using the output of the second summer to control the air/fuel ratio of the second bank.

* * * * *